United States Patent [19]

Corompt

[11] Patent Number: 4,758,123
[45] Date of Patent: Jul. 19, 1988

[54] MULTI-PURPOSE CONTAINER HANDLING DEVICE

[75] Inventor: Antoine Corompt, Loire, France

[73] Assignee: Bennes Marrel, France

[21] Appl. No.: 868,645

[22] Filed: May 29, 1986

[30] Foreign Application Priority Data

May 29, 1985 [FR] France ................ 85 08576

[51] Int. Cl.$^4$ ............................................. B65D 19/22
[52] U.S. Cl. ...................... 410/77; 108/51.1; 294/67.1; 294/67.3; 410/83
[58] Field of Search .......... 294/67.1, 67.4, 81.2, 294/81.51, 81.53, 81.55; 108/51.1, 54.1, 55.1–56.1; 206/511, 512, 386, 596, 598, 600; 220/1.5; 248/346, 500, 507; 410/46, 77, 82, 83, 90; 414/498, 607, 608

[56] References Cited

U.S. PATENT DOCUMENTS

| | | | |
|---|---|---|---|
| 3,507,224 | 4/1970 | Sweger | 410/83 |
| 3,545,713 | 12/1970 | Mowatt-Larssen | 410/83 |
| 3,866,970 | 2/1975 | Schwiebert | 410/83 |
| 4,537,540 | 8/1985 | Boughton | 410/82 |

FOREIGN PATENT DOCUMENTS 2054572 7/1971 Fed. Rep. of Germany ..... 294/81.2

*Primary Examiner*—Johnny D. Cherry
*Attorney, Agent, or Firm*—Remy J. VanOphem; James R. Ignatowski

[57] ABSTRACT

The present invention pertains to a platform having a front trestle that is designed for the handling of containers. This platform includes four ISO Standard corner fittings. The platform includes at its rear tiltable extension arms which selectively provide two rear twist locks on the platform, these in combination with two twist locks on the front of the platform provides a total of four twist locks. Because the rear twist locks can be rotated to a rearward operating position, the platform can receive an ISO type container regardless of the thickness of the trestle. When the rear twist locks are rotated to a forward retracted position, generally shaped containers can be handled as well. With this arrangement, the tiltable arms and their twist locks cannot be separated from the platform and can therefore not be lost.

3 Claims, 2 Drawing Sheets

MULTI-PURPOSE CONTAINER HANDLING DEVICE

BACKGROUND OF THE INVENTION

1. Field of the Invention

The present invention pertains to a new type of multi-purpose device designed for the handling and transportation of various types of containers or pallets, including standard type containers known as "ISO containers".

2. Description of the Prior Art

A traditional ISO container has the shape of a trapezoid with standard dimensions and whose corners are respectively equipped with a fixed corner fitting. Each corner fitting may receive a handling block called a twist lock which may be detachably mounted thereon to immobilize the container, either in a handling machine or on a carrier.

The front of a traditional handling container includes a vertical housing whose upper part may receive the lift hook of a handling device. The base of this container has ISO Standard dimensions and it receives a traditional container. In its front wall, a recess is provided to receive the trestle of a handling pallet. This type of container is described in French Pat. No. 2.358.352. However if a standard ISO container with a smooth front wall were to be put on a trestle type handling pallet, the back of the container and its corner fittings would extend at the back of the pallet over a distance equal to the thickness of the front trestle. In particular, this would prevent the locking of the container corner fittings on the pallet.

This disadvantage may be alleviated by offering two twist locks which may be detachably mounted on the back of the pallet. Unfortunately, this rear detachable twist locks arrangement offers several practical disadvantages. Among others, these detachable twist locks are too far away from the operator and they are frequently lost between trips.

SUMMARY OF THE INVENTION

The present invention eliminates these disadvantages by offering a handling pallet of the aforementioned type able to receive both front recess type and ISO containers without requiring the mounting of independent blocks for the rear twist locks.

A container handling device according to the invention includes a rectangular platform whose front is topped by a trestle designed to receive a lift hook. The platform includes four corner fittings, and a standard locking block is provided behind each one of the two front of corner fittings. In front and beside both rear corner fittings, the platform includes an axial recess wherein a cross-pin provides the pivoting axis of an axial arm, tiltable forward and backward, between the following two positions. In the rearward operating position, the arm extends toward the back of the platform whose upper horizontal face extends the loading surface. The arm is then topped by a twist lock rigidly mounted thereon whose spacing with the front twist locks is in compliance with the distance defined in the ISO standard. In the forward retracted position, the arm is tilted down forward in its recess and does not extend above the platform loading area whose total length, then, does not exceed the length defined by the ISO Standard.

BRIEF DESCRIPTION OF THE DRAWINGS

The attached schematic drawing will give a better understanding of the features of the invention.

DETAILED DESCRIPTION OF THE PREFERRED EMBODIMENT

Figure 1:
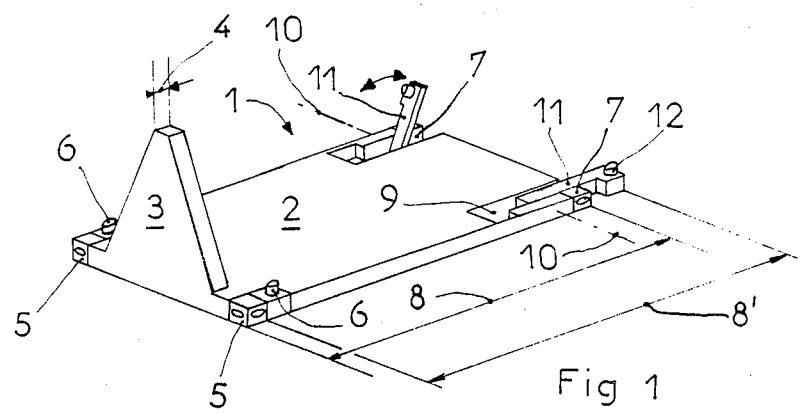
FIG. 1 is a schematic elevation showing the device described in the invention on the back of a handling platform.

The drawings represent the invented multi-purpose device 1 which includes a platform 2 constructed in a traditional manner in front. In particular, the front of the platform 2 is topped by a hook-up and handling trestle 3 rigidly mounted thereon. This trestle 3 has a thickness 4.

In front, the platform 2 includes, in a traditional manner, front corner fittings 5 followed by two twist locks 6.

In the back, the platform 2 also includes two rear corner fittings 7. The spacing between the front corner fittings 5 and the rear corner fittings 7 represents the overall distance 8 defined by the ISO Standard.

The invention provides, in the surface of the platform 2, in front of and next to the respective rear corner fittings 7, an axial recess 9 wherein a cross-pin 10 is used as a pivot for an axial arm 11.

Figure 3:
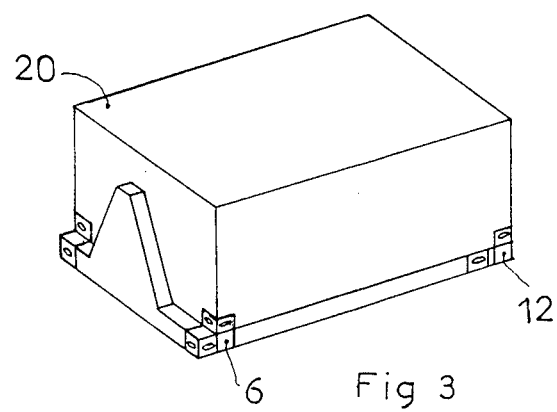
FIG. 3 shows the device in extension behind the platform which is thus able to receive an ISO container.
Figure 4:
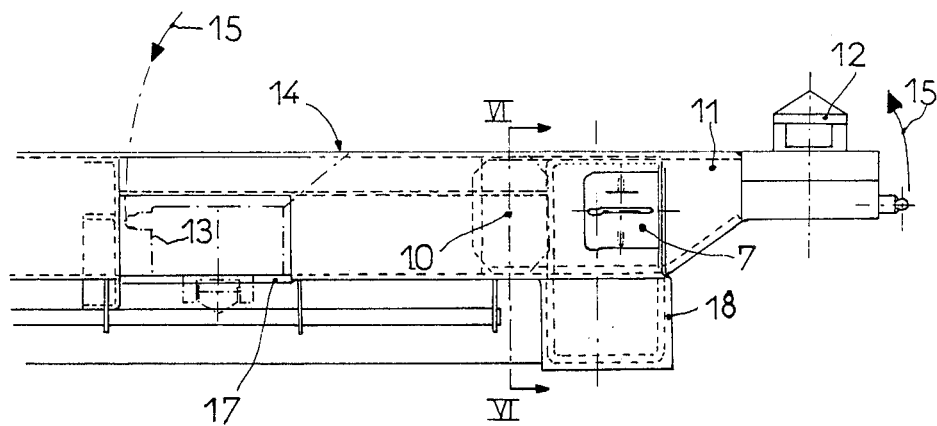
FIG. 4 shows a side view of the rear left arm in extension.
Figure 5:
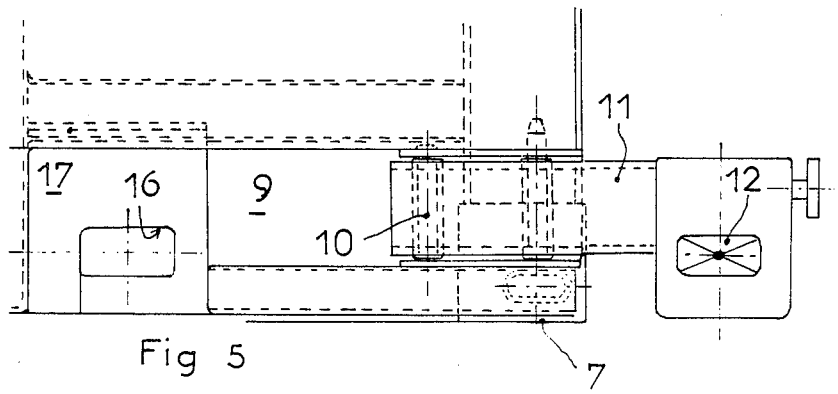
FIG. 5 illustrates the corresponding layout.
Figure 6:
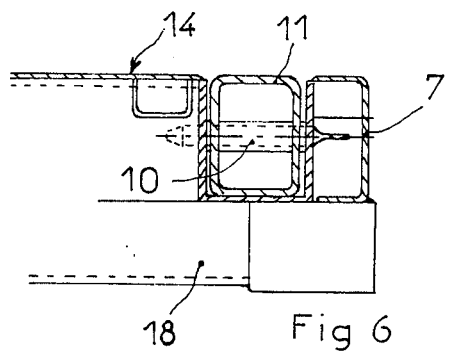
FIG. 6 is a sectional view along lines VI—VI in FIG. 4.

The free end of each arm 11 includes a twist lock 12 which extends upward when the arm 11 is tilted backward as shown on FIGS. 3 and 4.

FIG. 3 shows the device in extension behind the platform which is thus able to receive an ISO container. Distance 8' in FIG. 1 represents the ISO standard length now measured from the trestle 3.

However, when an arm 11 is tilted forward as indicated by arrows 15, shown in FIG. 4, to the position 13, it does not extend above the loading area 14 of the platform 2. In these conditions, the twist lock 12 is recessed through a slot 16 provided in a lower fixed plate 17 carrying the weight of the arm 11.

When the arms 11 are tilted backward as illustrated in FIGS. 3 through 6, each one is resting on a fixed cross-piece 18 so that the two rear twist locks 12 that it support are at the same level as both front twist locks 6.

The device operates as follows.

Figure 2:
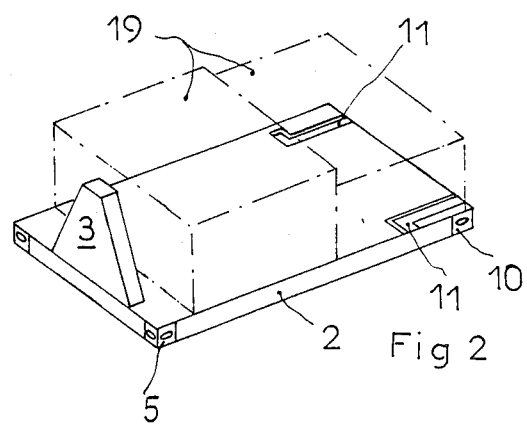
FIG. 2 shows the device in storage position in the back of the platform which then may be handled as an ISO container.

As both arms 11 are tilted forward, as illustrated in FIG. 2 and by position 13 in FIG. 4, the overall dimensions of the platform 2, with an overall length 8, comply with the ISO Standard. Carrying a load 19 of any shape, the platform may be handled by ISO Standard handling devices.

If, however, the arms 11 are tilted backward, FIGS. 1 and 3 through 6, the pallet has four twist locks 6 and 12 designed for an overall length which complies with the ISO Standard, namely due to the aforementioned distance 8'. In this case, it may receive and lock, by means of the twist locks 6 and 12, a Standard ISO container 20 as illustrated on FIG. 3.

It should be noted that, in order to switch from one positon to the other, it is enough to tilt the arms 11 which are part of platform 2. They cannot be removed therefrom.

What is claimed is:

1. A container handling device, comprising:
   a platform including a forward end and a rearward end, said platform further having four corners, two of said four corners being at said forward end of said platform and the other two of said four corners being at said rearward end of said platform, said platform further having a platform surface for receiving containers, said platform further having a pair of mutually parallel, spaced apart recesses in said platform surface running from said rearward end of said platform toward said forward end of said platform;
   an upstanding trestle having a predetermined thickness attached to said platform at said forward end thereof for receiving a lifting hook;
   a forward pair of twist locks attached to said platform, said forward pair of twist locks being separated by a distance defined by a predetermined standard, said forward pair of twist locks being spaced from said forward end of said platform by a distsance substantially defined by said thickness of said upstanding trestle;
   a first axial arm pivotably attached to said platform in one of said recesses, said first axial arm having a twist lock attached thereto, said first axial arm being pivotable about an axis located below said platform surface; and
   a second axial arm pivotably attached to said platform in the other of said recesses, said second axial arm having attached thereto a twist lock, said second axial arm being pivotable about an axis located below said platform surface, said first and second axial arms being pivotable between a forward retracted position and rearward operating position, said first and second axial arms being disposed generally below said platform surface when said first and second axial arms are in said forward retracted position and said rearward operating position, said twist locks on said first and second axial arms being mutually separated by a distance defined by said predetermined standard, said twist locks on said first and second axial arms further being separated from said forward pair of twist locks by a distance defined by said predetermined standard when said first and second axial arms are in said rearward operating position.

2. The container handling device of claim 1, wherein said platform has attached thereto at least one plate for supporting said first and second axial arms when said first and second axial arms are in said forward retracted position, said at least one plate being apertured so that each said twist lock on said first and second axial arms may pass therethrough.

3. The container handling device of claim 1, wherein said platform has a cross-piece attached thereto for supporting said first and second axial arms when said first and second axial arms are in said rearward operating position so that each said twist lock on said first and second axial arms and said forward pair of twist locks are at an equal height above said platform surface.

* * * * *

UNITED STATES PATENT AND TRADEMARK OFFICE
CERTIFICATE OF CORRECTION

PATENT NO. : 4,758,123

DATED : July 19, 1988

INVENTOR(S) : Antoine Corompt

It is certified that error appears in the above-identified patent and that said Letters Patent is hereby corrected as shown below:

Column 2, line 28, before "front" insert -- two --.

Column 3, line 26, "distsance" should read -- distance --.

Signed and Sealed this

Fourteenth Day of February, 1989

*Attest:*

DONALD J. QUIGG

*Attesting Officer*  *Commissioner of Patents and Trademarks*